United States Patent [19]
Malafosse

[11] 3,907,506
[45] Sept. 23, 1975

[54] APPARATUS FOR THE PREPARATION OF ALKALINE HYPEROXIDE

[75] Inventor: Jean Malafosse, Lyon, France

[73] Assignee: L'Air Liquide, Societe Anonyme pour l'Etude et l'Exploitation des Procedes Georges Claude, Paris, France

[22] Filed: Dec. 10, 1973

[21] Appl. No.: 423,504

Related U.S. Application Data

[62] Division of Ser. No. 268,835, July 3, 1972, Pat. No. 3,816,604.

[30] Foreign Application Priority Data

Mar. 17, 1972 France .................. 72.09323

[52] U.S. Cl. .......... 23/260; 23/286; 23/293 A; 23/285; 159/11 R; 423/581; 423/641; 264/3 C
[51] Int. Cl.² ................... B01J 2/24
[58] Field of Search ........ 23/285, 260, 286, 283, 23/293 A; 159/11 R, 49 R; 423/581, 641; 264/3 C

[56] References Cited
UNITED STATES PATENTS

| | | | |
|---|---|---|---|
| 1,688,060 | 10/1928 | Schwartz | 159/11 R X |
| 2,034,599 | 3/1936 | VanMarle | 159/11 R X |
| 2,245,098 | 6/1941 | Turek | 23/252 R X |
| 2,671,010 | 3/1954 | Governale | 23/252 R X |
| 2,685,500 | 8/1954 | Hulse et al. | 23/286 X |

*Primary Examiner*—James H. Tayman, Jr.
*Attorney, Agent, or Firm*—Browdy and Neimark

[57] ABSTRACT

An apparatus for the preparation of alkaline hyperoxides (superoxides) comprises a double-envelope fluid-tight reactor for containing mixed alkaline hydroxide and hydrogen peroxide, the reactor being provided with means for cooling and agitating the mixture. The apparatus also includes suitable means for assuring the rapid, continuous and punctual dehydration of the mixture leaving the reactor.

3 Claims, 1 Drawing Figure

US Patent  Sept. 23, 1975  3,907,506
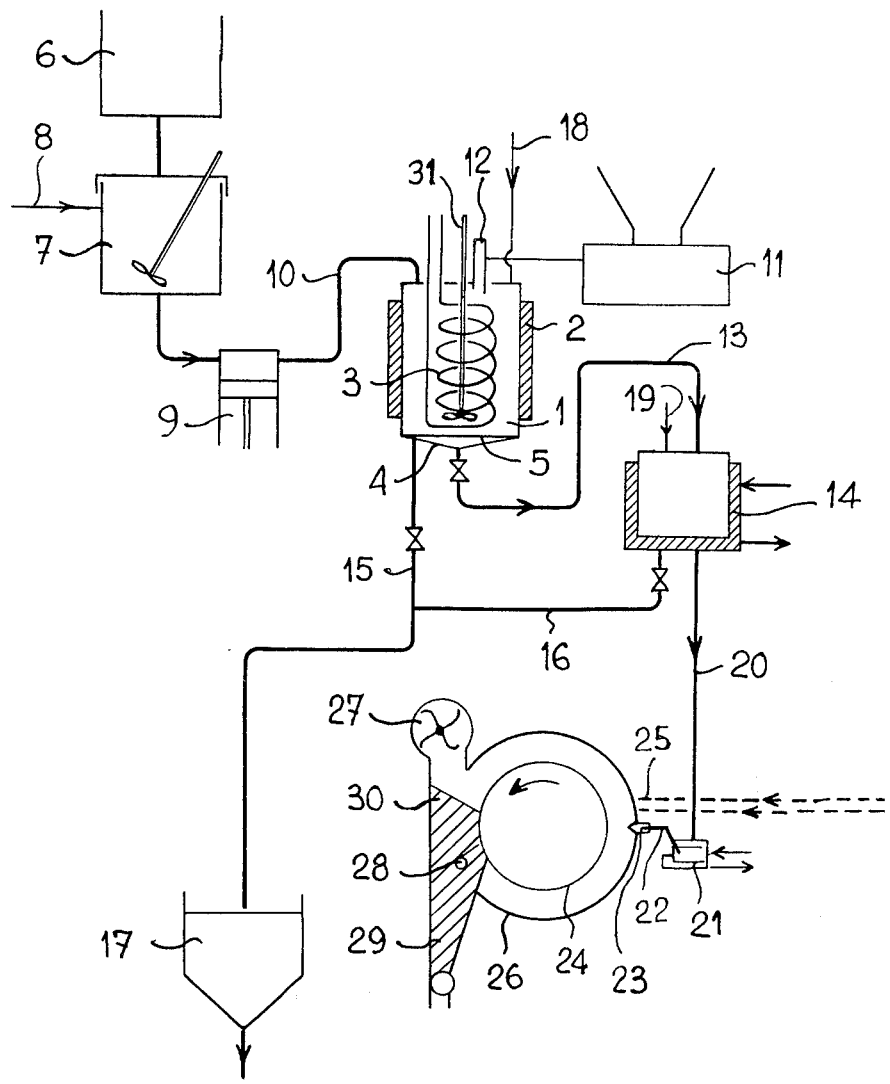

APPARATUS FOR THE PREPARATION OF ALKALINE HYPEROXIDE

This application is a divisional of Ser. No. 268,835 filed July 3, 1972, now U.S. Pat. 3,816,604.

The present invention relates to the preparation of alkaline hyperoxides (superoxides) and more particularly to an apparatus for the preparation of potassium hyperoxide suitable for direct pelleting.

The principle involved in the preparation of potassium hyperoxide, the formula of which is $KO_2$, from hydrogen peroxide and potassium hydroxide is well known. According to the work of Karzarnovkii and Nieding, "Doklady. Akad. Naud," U.S.S.R., 86 717 (1952), $H_2O_2$ with KOH yields a potassium dihydroperoxidate peroxide according to:

a. $2 KOH + 3 H_2O_2 \rightarrow K_2O_2 \cdot 2 H_2O_2 + 2 H_2O$.

Disproportionation of potassium dihydroperoxidate peroxide, without special precautions, results in the following reaction:

d. $K_2O_2 \cdot 2 H_2O_2 \rightarrow 2 KO_2 + 4(KOH \cdot H_2O) + 3 O_2$ but this disproportionation equation is the overall result of two reactions; the first, corresponding to the formation of potassium hyperoxide according to:

b. $K_2O_2 \cdot 2 H_2O_2 \rightarrow 2 KO_2 + 2 H_2O$ is followed by the reaction of water on the potassium hyperoxide formed in accordance with:

c. $2 KO_2 + 3 H_2O \rightarrow 2 KOH \cdot H_2O + \frac{3}{2} O_2$.

Furthermore, in an atmosphere containing carbon dioxide, there is a reaction of $CO_2$ on potassium hyperoxide:

e. $CO_2 + 2 KO_2 \rightarrow CO_2K + \frac{3}{2} O_2$.

The Soviet authors mentioned above employ reaction b) and effect dehydration by utilising the conventional laboratory means, i.e., a sulphuric or phosphoric in vacuo desiccator at ambient temperature.

U.S. Pat. No. 3,120,997 merely repeats the technique previously described without supplying a technological solution which would permit industrial exploitation of the process. Furthermore, the technique described in this specification is of a "delicate" nature and the results indicated are difficult to reproduce.

The main difficulties experienced in the preparation of potassium hyperoxide from potassium hydroxide are first of all due to the highly exothermic nature of the addition of hydrogen peroxide to potassium hydroxide, the result thereof being considerable evolution and a considerable loss of oxygen. On the other hand, the action of water on hyperoxide makes it necessary to effect the potassium dihydroperoxidate peroxide disproportionation reaction in apparatus permitting the separation as rapidly as possible of potassium hyperoxide from reaction or dilution water. A third difficulty is due to the action of carbon dioxide which makes it necessary to effect all the operations in a decarbonated atmosphere.

In French Pat. No. 1,460,714 of the 29th September, 1965, there is disclosed a process wherein reaction a) is effected by the introduction in calculated fashion of hydrogen peroxide in the dispersed state into an organic medium which is inert relative to the reagents concerned and which does not dissolve them; the aqueous phase is separated and then alkaline hyperoxide is prepared therefrom by pulverisation and rapid drying. This process can be applied only with difficulty to industrial manufacture, since it involves three heterogeneous phases and is thus limited to discontinuous operations; furthermore, despite all the precautions taken, solvent losses are inevitable, and this makes the operation more costly. On the other hand, despite the employment of pure potash and alcohol, the stability of the solution obtained is low and is not sufficient to warrant industrial exploitation.

For effecting reaction (b), there has been disclosed an apparatus of the scaler-drier type wherein the external wall of the cylinder is zirconium, porcelain, glass or polytetrafluoroethylene. In fact, the non-metallic materials are not compatible with industrial utilisation of this type and zirconium is a costly rare metal the metallurgy of which is difficult and which has the disadvantage that it is soft, its hardness diminishing very considerably even under the action of the functioning temperature.

According to the invention, there has been found means permitting the amelioration of the disadvantages encountered in the known processes and the preparation of an alkaline hyperoxide, in particular potassium hyperoxide, in pulverulent form such as is directly suitable for pelleting or pastille-preparation.

The present operation wherein hydrogen peroxide is reacted with an alkaline hydroxide in an aqueous medium, is characterised in that a concentrated aqueous solution of alkaline hydroxide and hydrogen peroxide is continuously prepared by adding the two reagents to a preformed mixture thereof, the continuous addition of alkaline hydroxide and hydrogen peroxide at a titer at least equal to 85% and at rates such that the molar ratio $H_2O_2/MOH$ is maintained between approximately 1.5 and 1.75 (M designating an alkaline metal) and the temperature of the solution is lower than 10° C, is effected, and then alkaline hyperoxide is prepared from the said solution by continuous, punctual, rapid dehydration.

According to an object of the invention, the preformed mixture of the reagents is prepared by the addition of solid alkaline hydroxide to a relatively diluted hydrogen perioxide the concentration of which is between 50 and 80%, until the molar ration $H_2O_2/MOH$ is lower than 1.5, then there is added hydrogen peroxide the concentration of which is higher than 90%, preferably between 94 and 98%, until the molar ratio $H_2O_2/MOH$ is maintained between 1.5 and 1.75, the temperature of the preformed mixture being maintained below 10°C.

The preparation of the preformed mixture (so-called sediment or "heel") according to the process of the invention permits the preparation of a stable mixture and prevents any crystallisation at the temperature under consideration.

On the heel thus produced, there may be effected the continuous addition of solid potash and hydrogen peroxide the titer of which is higher than 85%, at rates so selected that the molar ratio $H_2O/KOH = R$ remains between 1.5 and 1.75 and the heat exchange capacity of the mixing apparatus permits maintaining the temperature of the solution between 0° and 5° C, drawing-off of the solution obtained being effected continuously at the base of the apparatus with the aid of a device permitting maintenance of a constant liquid level.

The process of the invention is compatible with the utilisation of inexpensive and readily available raw material, such as flake potash of the so-called low iron-content type, which may contain up to 10 p.p.m. of $Fe^{++}$ and/or $Fe^{+++}$ cations.

It has been found that it is possible to obtain a $K_2O_2$, $2 H_2O_2$ concentrated aqueous solution which is stable for several days at a temperature lower than 10° C, preferably between 0° and 5°C, by employing as reagent hydrogen peroxide the content of which is at least equal to 85% and in which the $Mg^{++}$ cation is preferably present in the amount of 1.65 to 8.25 g. per l. of $H_2O$; the $Mg^{++}$ may be incorporated in the form, for example, of heptahydrated sulphate, preferably at a concentration between 10 g and 50 g of $MgSO_4 . 7 H_2O$ per litre of hydrogen peroxide.

It is advantageous to maintain a temperature ranging between 0° and 5°C during the various phases of the process, i.e., preparation of the preformed mixture, preparation of the concentrated $K_2O_2 . 2 H_2O_2$ aqueous solution, and storage thereof.

It has been found that the carrying into effect of reaction (b) for disproportionation or dehydration of the solution $K_2O_2 . 2 H_2O_2$ by continuous rapid, punctual drying is effected in a particularly advantageous manner with the aid of a scaling or flaking drier the cylinder of which is externally covered with a layer of electrolytic nickel. Such disporportionation is effected at a temperature ranging between 100° and 400° C, preferably between 140° and 180°C.

On the other hand, it has been found that it is unnecessary to employ a perfectly inert and dry atmosphere for the carrying into effect of the phases of the process as a whole. An atmosphere constituted by air at least partially freed from carbon dioxide is suitable for the satisfactory carrying into effect of the process.

The process of the invention makes it possible to prepare on an industrial scale a powder the grain size and apparent density of which are suitable for a pelleting or pastille-forming operation. The product thus prepared is particularly suitable for the preparation of cartridges for lifesaving respiratory apparatus.

The apparatus of the present invention comprises a reactor or mixer containing the mixed alkaline hydroxide hydrogen peroxide and to which is fed additional quantities of alkaline hydroxide and of stabilized hydrogen peroxide. Such reactor is a tubular reactor or a double jacket insulated reactor, and includes suitable means for cooling and agitating the mixture therewithin.

The apparatus also includes suitable means for assuring the rapid, continuous and punctual dehydration of the mixture leaving the reactor. Such dehydration means includes a dehydration chamber containing a rotating cylinder coated with electrolytic nickel or equivalent material, and a scraper against which the cylinder rotates to recover the product dried thereon. The cylinder is heated internally to maintain a temperature of 100°–400°C, preferably 140°–180°C., so that the liquid mixture striking the cylinder is dried and pulverized thereon. The dried material is then scraped from the cylinder using suitable scrapper means, and is then collected.

Between the reactor and the dehydrator there is provided suitable means for transporting the liquid mixture while maintaining it at less than 10°C. Such liquid mixture is sprayed into the dehydration chamber against the cylinder from suitable atomizers or nozzles, which may be of the sheet jet type, so spaced from the cylinder that rebounding of the mixture from the cylinder is avoided, the nozzles being formed of an insulating material compatible with the mixture, e.g., polytetrafluoroethylene. The nozzles are swept by a current of air which entrains the liquid mixture to effect the spraying, and the shock heating of the mixture from 10° C to 140°–180° C converts the alkaline (e.g., potassium) dihydroxy peroxidate to the desired alkaline hyperoxide.

The dehydration chamber is also provided with means to sweep its interior with decarbonated air at a temperature of 180°–200° C.; this current of air contributes to the application of the necessary energy for the reaction and the drying. Such air feeding is accomplished in such a manner as to avoid disturbance of the atomization, and, if necessary, suitable means may be provided, such as baffles, to accomplish this objective.

An example of the mode of carrying into effect and of apparatus is given hereinbelow by way of a non-limitative example.

EXAMPLE a. Continuous preparation of the aqueous concentrated solution of potash and hydrogen peroxide.

Into a reactor 1 consisting of a stainless steel cylinder having a double envelope 2, a cooling coil 3, a mixer 31, a bottom 4 made from polyvinylchloride and provided with a grid 5 manufactured from the same material, there is introduced hydrogen peroxide the titer of which is higher than 85% and which contains a stabilizing quantity of $MgSO_4 . 7 H_2O$, the delivery rate being 16.5 g per litre. The hydrogen peroxide is first of all stored in the receptacle 6 before being introduced into the receptacle 7 where it receives, via a pipe 8, the appropriate quantity of heptahydrated magnesium sulphate; the $H_2O_2$ is then supplied to the reactor 1 by the pump 9 and the piping 10. Simultaneously, there is supplied, with the aid of the solid distributor or conveyor 11 and the pipe 12, a solid industrial potash in flake form at 85–88% KOH and which may contain up to 10 p.p.m. of iron ions. These two reagents are continuously introduced into the reactor, already filled with the KOH — $H_2O_2$ mixture (see, hereinbelow, the description of the initial filling operation); the contents of the reactor are agitated by the mixer 31 at two levels, in such manner that the solid potash particles dropping to the surface of the liquid are immediately dispersed. It is the purpose of the grid 5 to prevent the emergence from the reactor of large particles of potash which have not completely reacted.

The solution is taken-off through the conduit 13 disposed in such manner as to maintain within the reactor 1 a constant level just reaching the top of the coil 3; such solution is stored in an insulated and/or cooled receptacle 14. The reactor 1 and the receptacle 14 are provided with a safety device permitting rapid emptying of the solution which they contain when the temperature exceeds a predetermined value indicative of the commencement of decomposition, via respectively tubes 15 and 16, to a receptacle 17 containing water, this receptacle being emptied into the exterior. If the emptying operation is triggered, the receptacles 1 and 14 receive water through the pipes or tubes 18 and 19, respectively.

The yields by weight of 85% $H_2O_2$ and 85–88% KOH are equal and are such that the temperature ranges between 0° and 5° C. The apparatus 1, 11, 14 are swept by air freed from $CO_2$.

b. Initial filling of the reactor.

This operation is effected once per manufacturing operation by adding to the reactor 1 containing hydrogen peroxide diluted to approximately 70% by weight, solid potash at a rate such that the temperature does not exceed 10° C and in a quantity such that the final KOH content of the mixture is outside the range of concentrations such as are normally utilised and higher than the latter, i.e., up to a ratio R = mol $H_2O_2$/mol KOH<1.5. Then, suitable proportions are recovered by adjusting the active oxygen titer of the solution by means of 98% hydrogen peroxide (1.5 <R<1.75).

c. Preparation of the hyperoxide.

The solution contained in receptacle 14 is transferred via a tube 20 into a receptacle 21 which is maintained at a temperature ranging between 0° and 5° C. Dipping into the receptacle 21 are one or more tubes 22 made of polytetrafluoroethylene serving for the feeding with liquid of atomisers 23 functioning by suction. These apparatus of the "flat jet" type, project the solution in fine droplets against a rotating cylinder 24 externally covered with a layer of nickel deposited by electrolytic means. Above the row of atomisation jets, there is supplied via a pipe 25 a flow of decarbonated air heated to 180°–200° C. The cylinder is heated by internal steam circulation in such manner that its surface temperature, before any atomisation takes place, is 160° C. The cylinder is disposed in a cylindrical compartment 26 provided with a device for the aspiration of moist air 27. The potassium hyperoxide forming on the cylinder is detached therefrom by scraping with the aid of a steel blade 28 and extracted from the apparatus by passage through a funnel 29; the baffle 30 separates, in the apparatus, the moist reaction zone from the dry hyperoxide extraction zone.

Employing this type of apparatus, comprising an 8 1. reactor 1, there is prepared at a rate of 3 kg/h a composition solution the active oxygen titer of which is 19.5% and the molar ratio $H_2O_2$/KOH = 1.65. After atomisation with a liquid flow rate of 3 kg/h and a hot gas flow rate of 40 m³/h, there is obtained a pulverulent product at the rate of 1350 g/h, this being a yellow product containing 80 to 85% of $KO_2$ powder and having an apparent density, after light crushing, of 0.45 g/cm³. This powder may be converted directly to pellets or pastilles without adjuvant of any kind and with the aid of conventional apparatus; only slight pressure is necessary for such agglomeration.

It will be obvious to those skilled in the art that various changes may be made without departing from the scope of the invention and the invention is not to be considered limited to what is shown in the drawing and described in the specification.

What is claimed:

1. An apparatus for the preparation of alkaline peroxide from a concentrated aqueous solution of alkaline hydroxide and hydrogen peroxide, comprising a double-envelope fluid-tight reactor having a double-envelope wall, said reactor being provided with means for cooling and for maintaining the temperature within said reactor at less than 10°C, means for immediately dispersing solid alkaline hydroxide particles and for agitation, first means for introduction of a first reagent, second means for introduction of a second reagent, means for drawing-off of a concentrated aqueous solution of the reagents from said reactor and grid means to prevent exit from the reactor into the drawing-off means of large particles of alkaline hydroxide;

a storage receptacle provided with cooling means to maintain said solution cold and connected to said reactor via said drawing off means;

means for receiving and then spraying the said cold solution, said receiving and spraying means comprising an atomisation device of the sheet or flat jet type and formed of polytetrafluoroethylene;

means for providing the rapid and punctual dehydration of said cool solution by shock heating and for providing alkaline hydroxide in the form of a powder, comprising a scaler or flaking drier having an internally heated rotating cylinder for receiving said cold solution as atomized from said atomization device, said cylinder being provided externally with a coating of electrolytic nickel, said cylinder being situated within a fluid-tight compartment having a dry zone and a moist zone separated by baffle means, said compartment being provided in said moist zone with a device for the aspiration of moist air and in said dry zone with scraper means for the recovery of the hyperoxide by scraping from the drum and with solids withdrawal means for the removal of the so-scraped alkaline hyperoxide.

2. Apparatus according to claim 1 comprising means for maintaining the temperature of said cylinder at 100°–400° C.

3. Apparatus according to claim 1, wherein said cooling means include means for maintaining temperature at 0°–10° C.

* * * * *